United States Patent [19]

Lush

[11] 3,812,949

[45] May 28, 1974

[54] CRACK-OFF APPARATUS FOR GLASS ARTICLES

[75] Inventor: John S. Lush, Lancaster, Ohio

[73] Assignee: Anchor Hocking Corporation, Lancaster, Ohio

[22] Filed: Dec. 23, 1971

[21] Appl. No.: 211,471

Related U.S. Application Data

[62] Division of Ser. No. 882,969, Dec. 8, 1969, Pat. No. 3,650,724.

[52] U.S. Cl. .................. 198/21, 198/25, 198/106
[58] Field of Search ......... 198/25, 21, 32, 34, 34 A, 198/167, 106

[56] References Cited
UNITED STATES PATENTS

| | | | |
|---|---|---|---|
| 2,071,859 | 2/1937 | Steiner | 198/32 |
| 2,380,910 | 7/1945 | Newton | 198/106 |
| 2,725,138 | 11/1955 | Fechheimer | 198/167 X |
| 2,773,583 | 12/1956 | Rand | 198/21 |
| 2,838,161 | 6/1958 | Page | 198/32 |
| 3,650,371 | 3/1972 | Constable | 198/106 X |

Primary Examiner—Edward A. Sroka
Attorney, Agent, or Firm—Holland, Armstrong, Wilkie & Previto

[57] ABSTRACT

An improved article transfer and feeding apparatus is described for transferring articles such as glass containers or the like from a row conveyor into spaced work stations on a rotating turret as might be used, for example, in a glass tumbler crack-off machine. The improved transfer means includes a narrow conveyor which receives the rows of articles from the row conveyor and which intermittently carries these articles to a transfer wheel which passes them onto a single line article spacing conveyor including spacing wheels. Means are provided at the exit in the spacing conveyor including a second transfer wheel for moving the articles into the spaced work stations on the rotating turret.

5 Claims, 24 Drawing Figures

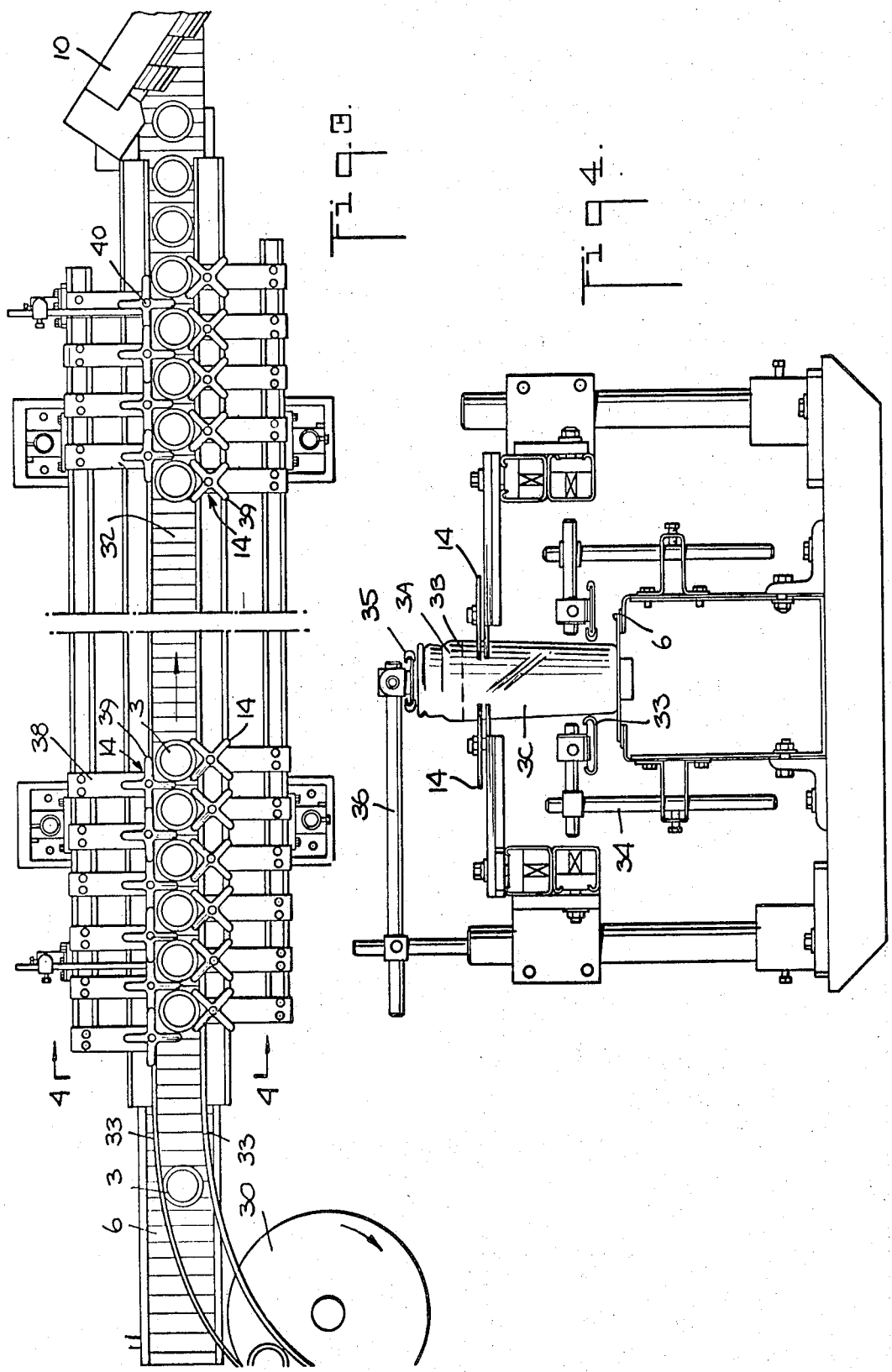

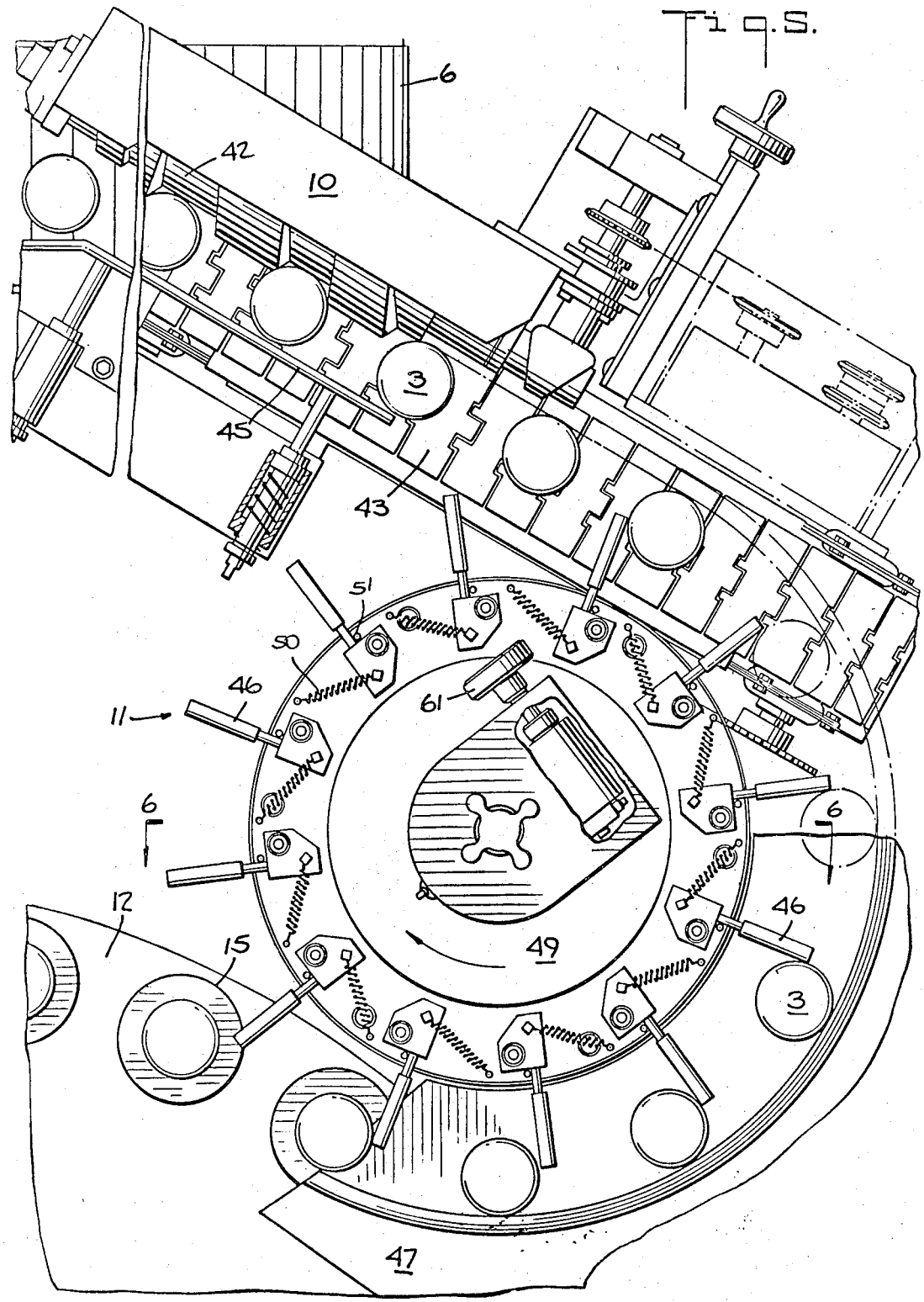

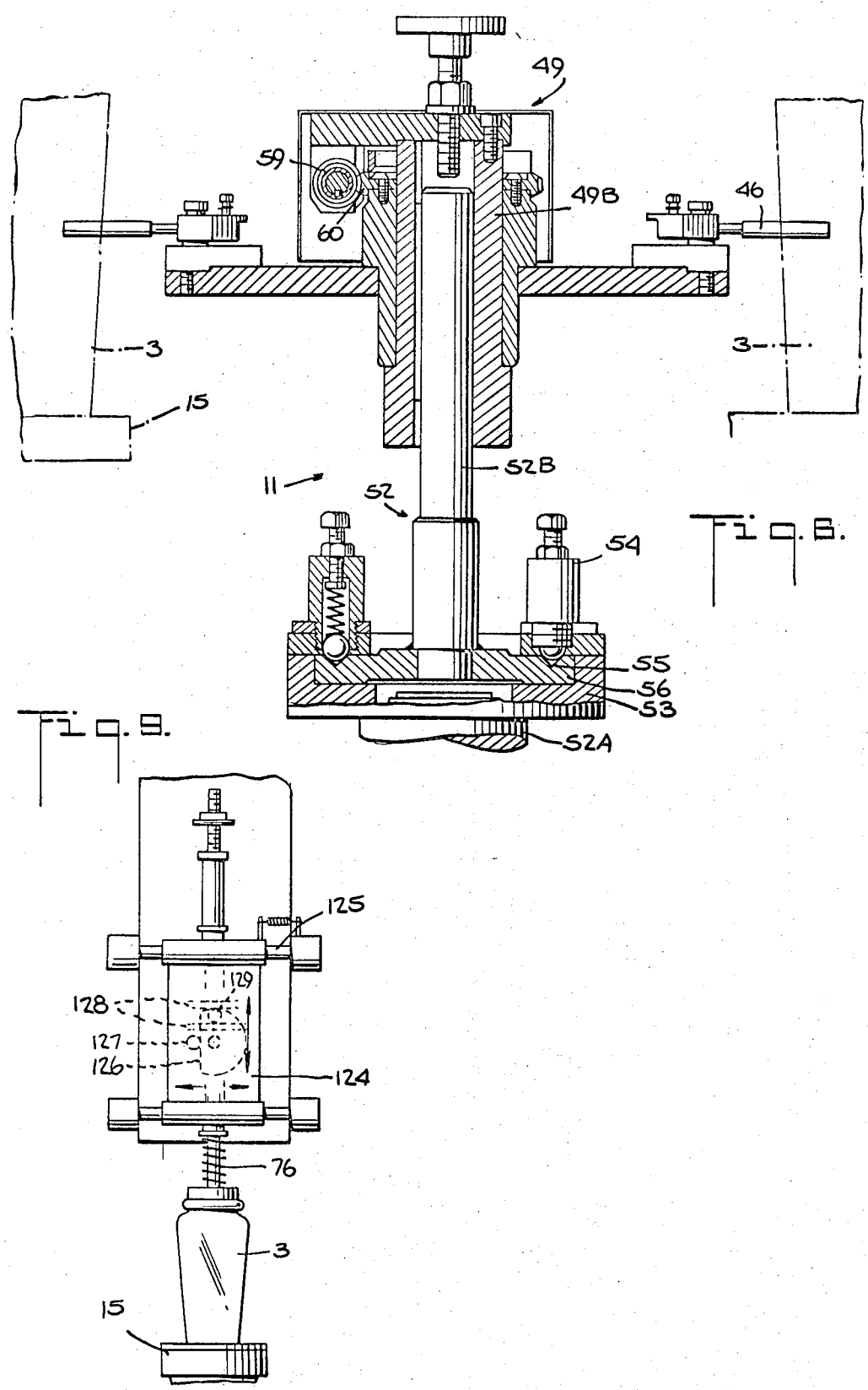

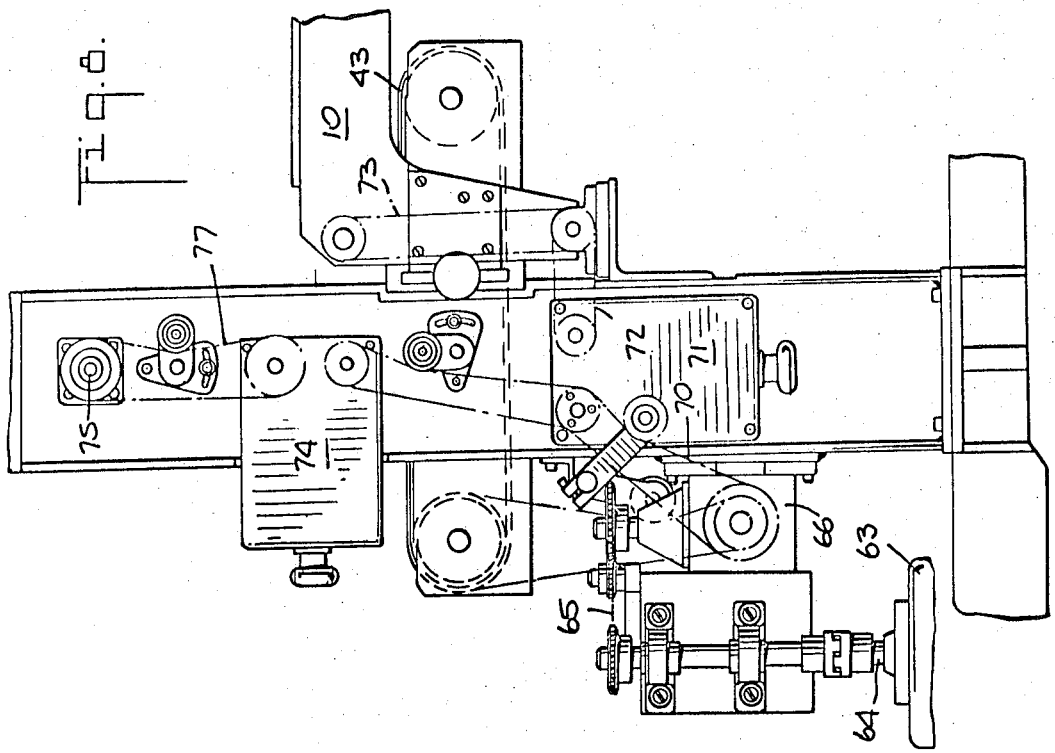
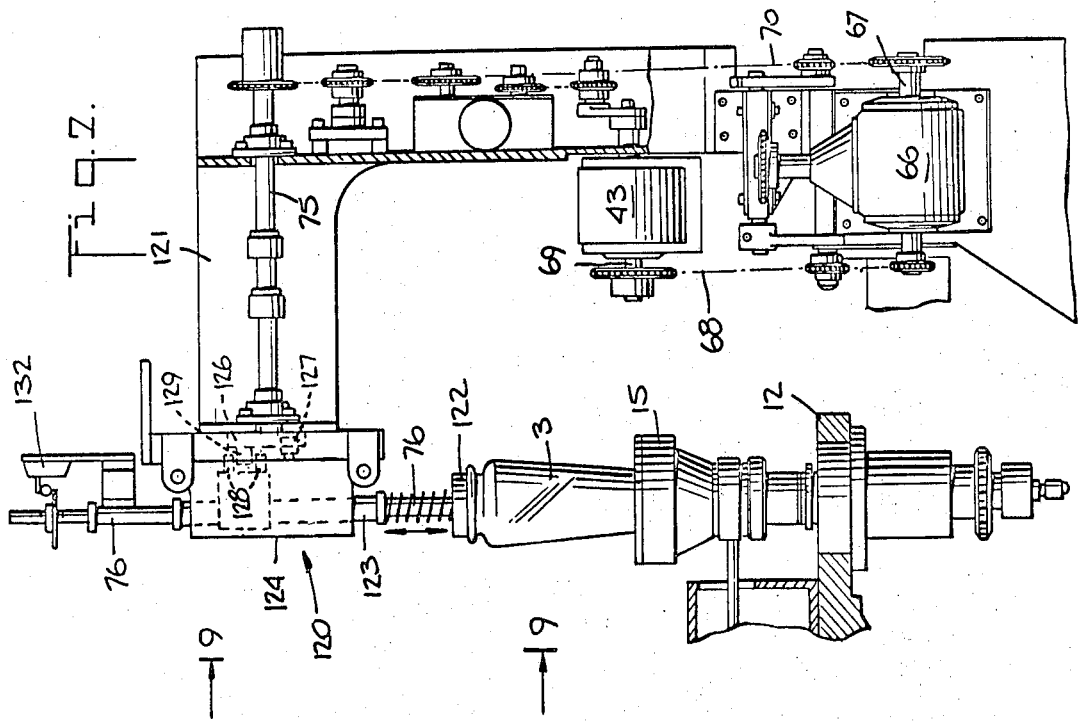

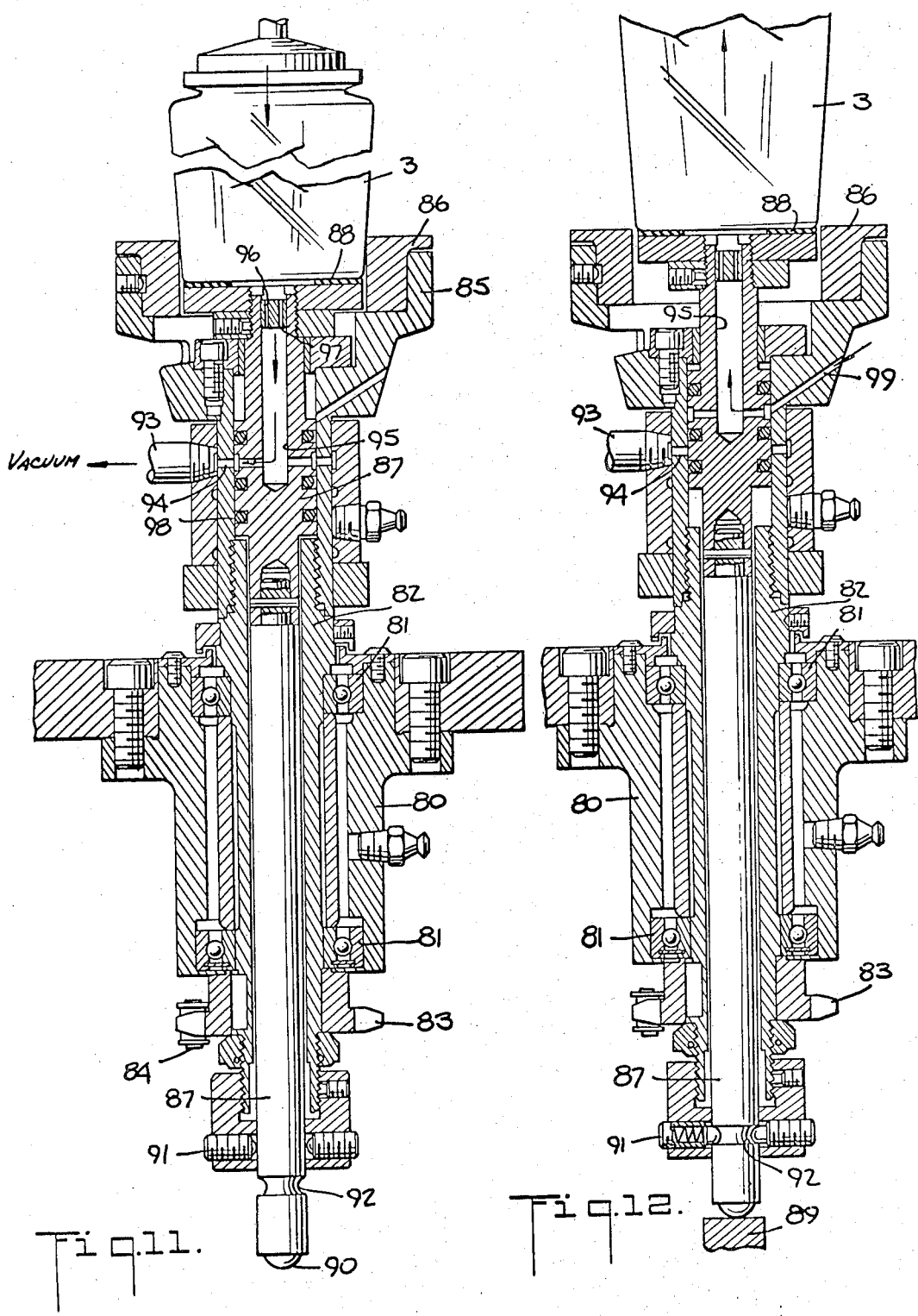

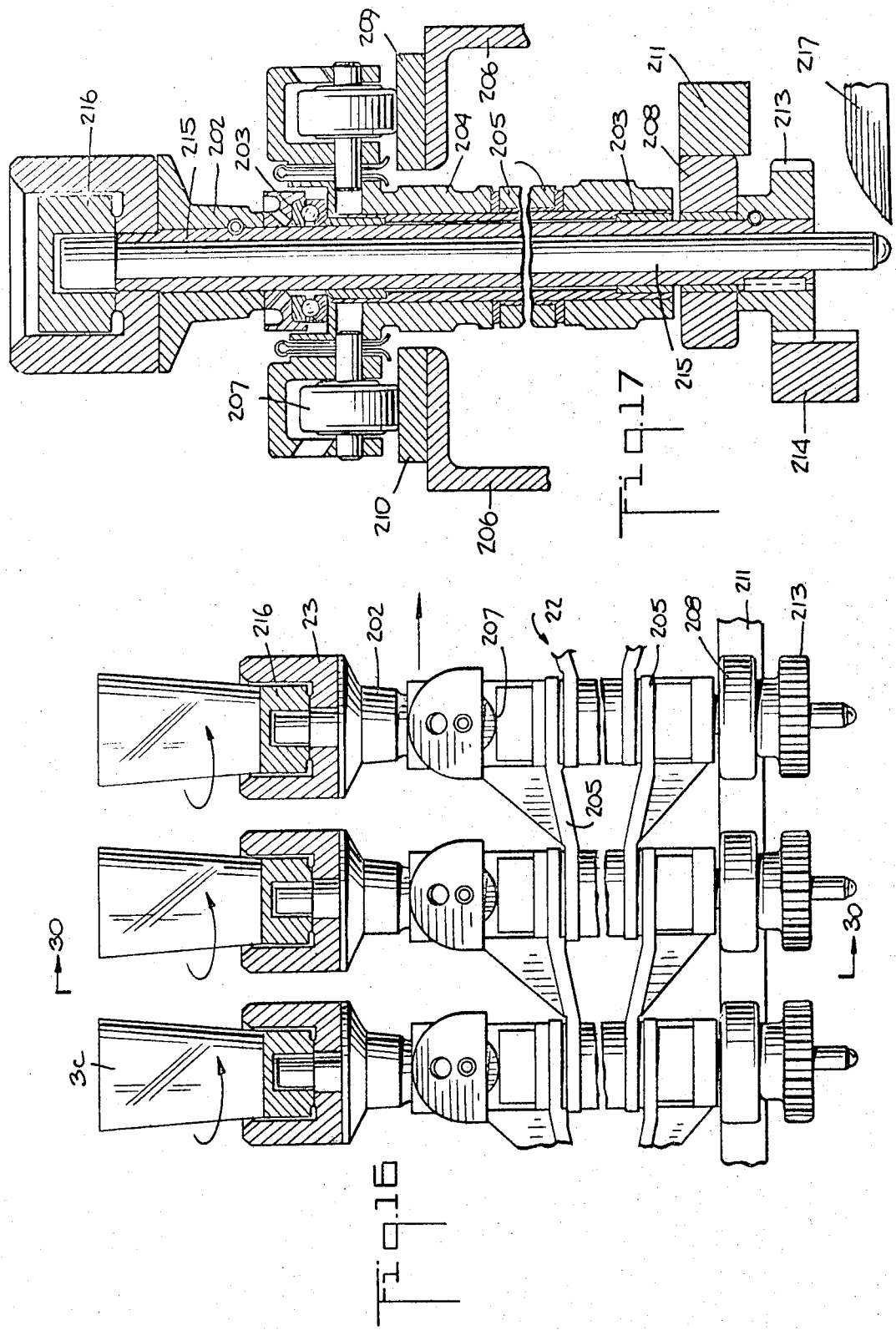

CRACK-OFF APPARATUS FOR GLASS ARTICLES

This application is a division of application, Ser. No. 882,969 filed Dec. 8, 1969 now U.S. Pat. No. 3,650,724 dated Mar. 21, 1972.

BACKGROUND OF THE INVENTION

The present invention relates to an improved automatic apparatus used in the manufacture of glass tumblers or other glass vessels where a portion of the original article, as formed in the glass forming machine, must be removed to complete the manufacture of the hollow glass article. In manufacturing tumblers and other hollow glass articles, for example, the individual articles are formed in an operation which includes a pressing, blowing, or other molding step where the article as formed includes a neck ring and an adjacent shoulder which must be removed to complete the glass articles. This portion of the molded article which is provided to facilitate the forming operation, often known as a moil, is removed or cracked-off in the terminal portion of the manufacturing operation.

The apparatus of the present invention has an improved automatic means for performing this crack-off operation to complete the glass articles. As will be more fully described below, the machine is designed to receive the articles directly from a regular annealing lehr conveyor or other conveyor and to perform all steps necessary to carry the articles through a crack-off operation and to the final inspecting or packing station.

Machines of this general type are known which perform this operation, however, they have serious limitations both in the acceptability of the completed article and in their adaptability to high speed crack-off operations adaptable for handling a variety of differing shapes of glass articles.

The crack-off machine of the present invention combines a fast reliable crack-off and edge forming operation without mechanical polishing and combines these advantages with a relatively simple article handling arrangement which permits rapid passage of the glass articles through the machine without damage and which is also adaptable to handle differing sizes and shapes of molded articles and finished glass products.

SUMMARY OF THE INVENTION

The crack-off apparatus in accordance with the present invention is adapted to receive molded glass articles in rows as they emerge from a conventional lehr or other processing device on a conveyor. These rows of articles are first transferred by an intermittent transfer device including a single-file conveyor, onto a controlled in-feed conveyor. The articles are arranged in close proximity in single-file thereon with means to insure support for the articles particularly where they may have a tapered shape.

The articles are now fed by a feed screw and transfer wheel onto individual support chucks mounted at the periphery on a rotating crack-off turret on a crack-off machine. Each of these chucks supports an individual molded article in upright position and presents the article successively to a crack-off device which removes the moil and then to edge polishing nozzles which complete the formation of a smooth narrow edge on the article. The articles are next transferred to an annealing and cooling conveyor which also have individual chucks. These chucks receive the cracked-off articles and move them past annealing heaters and cooling means and then present them to an inspection and unloading conveyor where the completed articles may be packaged for storage or shipment to a customer.

Accordingly, an object of the present invention is to provide an improved high speed automatic crack-off machine for manufacturing high quality thin-rimmed tumblers and other glass articles or vessels.

Another object of the present invention is to provide an improved crack-off machine for thin-edged articles which is adapted for high speed automatic operations and for handling a variety of differing article shapes and sizes.

Other and further objects of the invention will be obvious upon an understanding of the illustrative embodiment about to be described or will be indicated in the appended claims, and various advantages not referred to herein will occur to one skilled in the art upon employment of the invention in practice.

A preferred embodiment of the invention has been chosen for purposes of illustration and description and is shown in the accompanying drawings, forming a part of the specification, wherein:

FIG. 3 is a top plan view of the in-feed conveyor including the means for stabilizing tapered articles at this position.

FIG. 4 is a vertical sectional view of the conveyor of FIG. 3 taken along line 4—4 on FIG. 3.

FIG. 5 is an enlarged detailed plan view of the feed screw and transfer wheel for feeding the glass articles onto the crack-off turret.

FIG. 6 is a vertical sectional view of the transfer wheel taken along line 6—6 on FIG. 5.

FIG. 7 is a side elevational view of the pusher apparatus for loading the glass articles into the chucks on the crack-off turret.

FIG. 8 is a rear elevational view of the pusher drive stand of FIG. 7.

FIG. 9 (on sheet 5 adjacent FIG. 5) is a vertical sectional view taken along line 9—9 on FIG. 7.

FIGS. 11 and 12 are vertical sectional views of the individual article supporting chucks illustrating the chuck in its operation position and in its raised article transfer position, respectively.

FIG. 16 is an enlarged fragmentary detailed side elevational view of the chain link conveyor in the annealing and cooling apparatus; and FIG. 17 is a vertical sectional view of the conveyor taken along line 17—17 on FIG. 16.

DESCRIPTION OF THE PREFERRED EMBODIMENT

The improved crack-off apparatus and system will first be described with particular reference to FIG. 1 and to certain other more detailed figures where designated.

Figure 1:
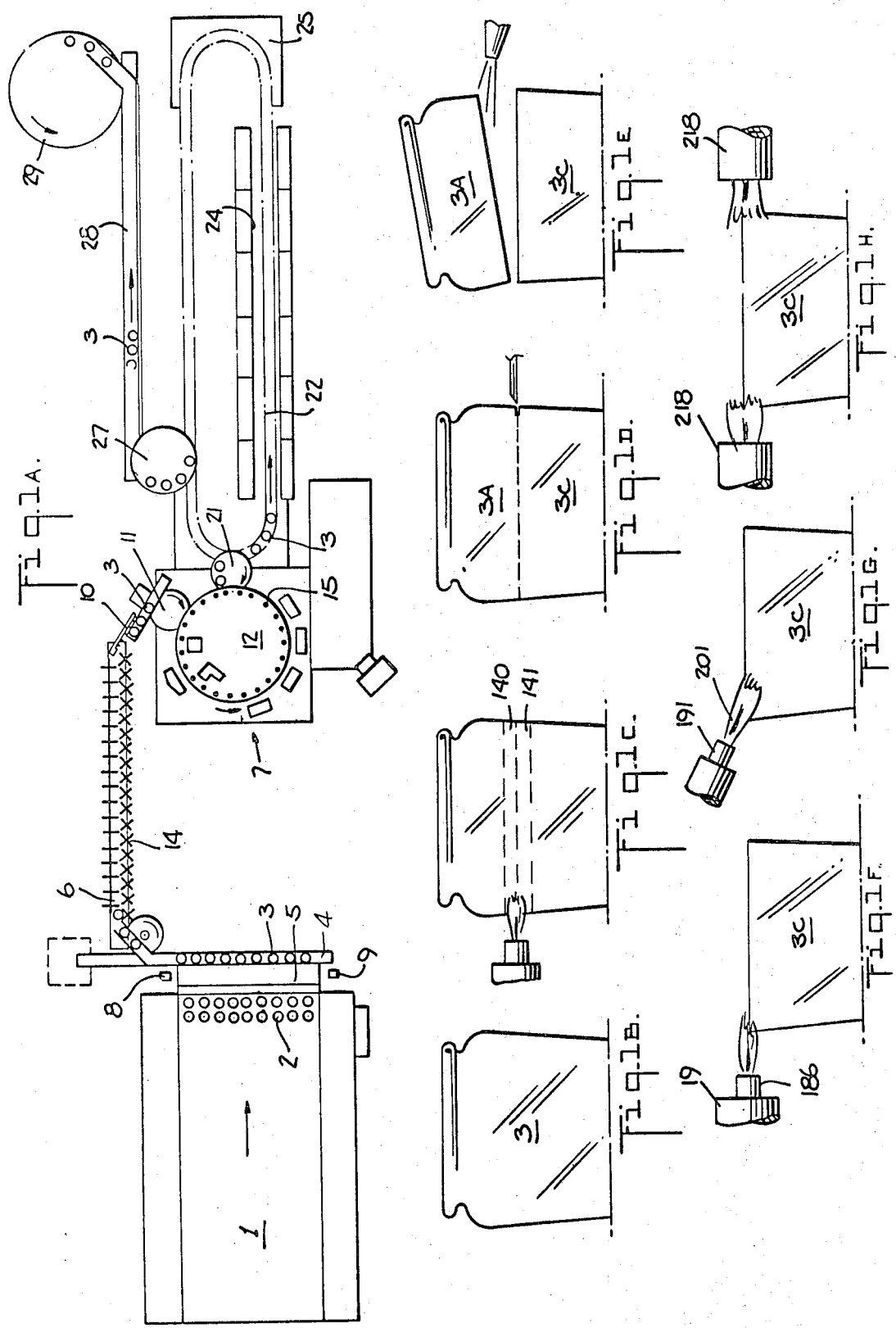
FIG. 1A is a diagrammatic plan view illustrating the improved crack-off apparatus in accordance with the present invention.
FIGS. 1B through 1H are a series of diagrammatic views showing in exaggerated form the several steps performed by the apparatus in the crack-off operation.

FIG. 1 shows a conventional broad belt conveyor 1 at the left-hand side of the type used to transport rows 2 of newly formed glass articles 3 from forming machinery through an annealing lehr or oven. The automatic crack-off apparatus of the present invention is seen to include a take-off conveyor 4 located at the end of the lehr conveyor 1 which intermittently moves the rows 2 of the annealed glass articles 3 into a single-line feeder and the operating portions of the crack-off apparatus. The rows of jars 2 are shown leaving the lehr conveyor 1 and passing over a downwardly inclined vibrating transfer plate 5 onto the intermittingly driven take-off conveyor 4. This conveyor 4 is intermittently moved forward a distance sufficient to carry a full row 2 of glass articles clear of the end of the vibrator plate 5 toward an in-feed conveyor 6 leading to the crack-off machine 7. The intermittent advance of the take-off conveyor 4 is controlled by a photocell system where a light beam between a photocell 8 and a light source 9 is interrupted by the arrival of a row of articles 3 onto the vibrator plate 5.

Figure 2:
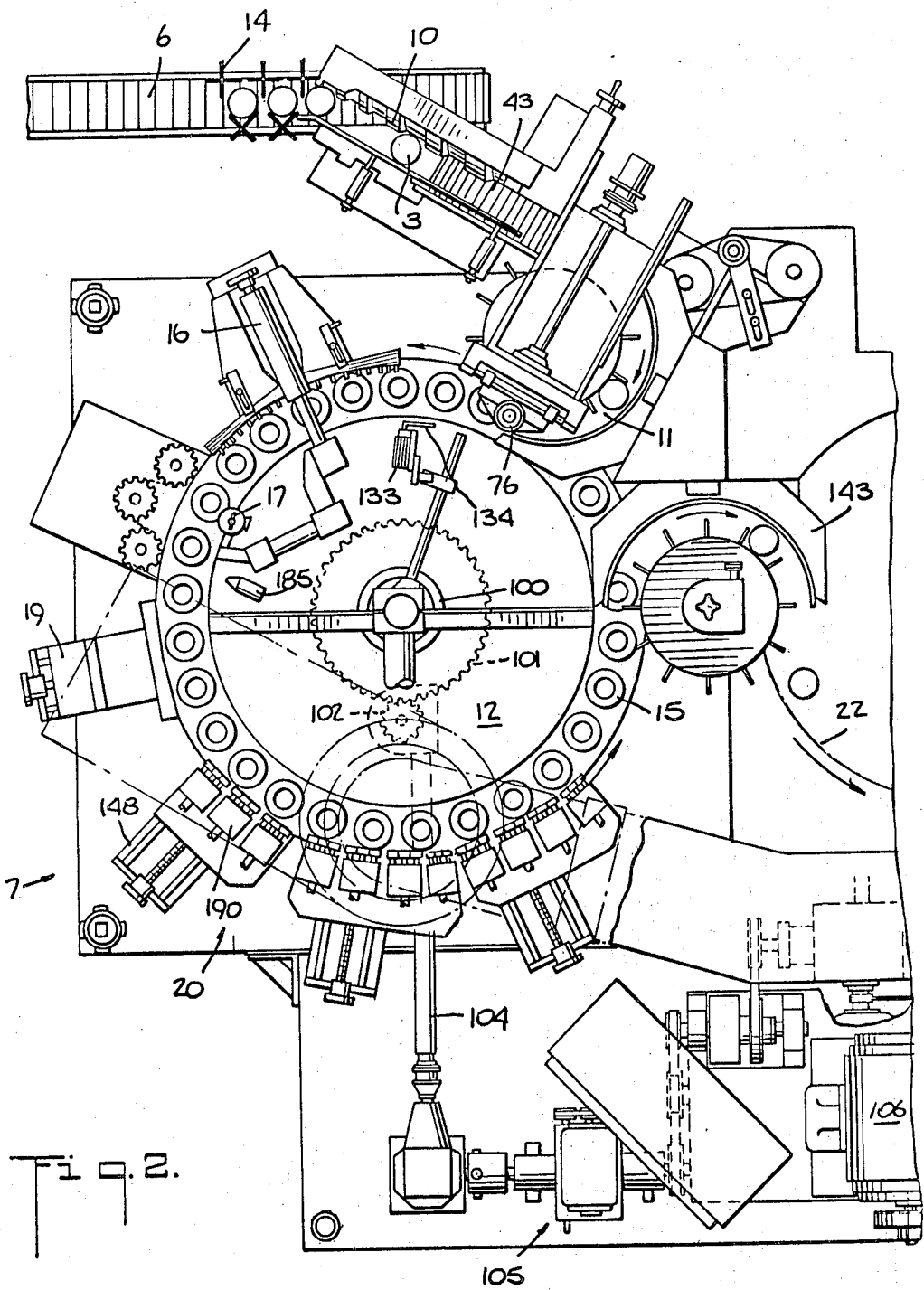
FIG. 2 is a top plan view illustrating the crack-off turret.

The output of the photoelectric system 8,9 is coupled through a time delay circuit to a drive motor for conveyor 4 so that the conveyor 4 is moved after a delay sufficient to assure the arrival of the row 2 of articles 3 onto the conveyor 4. The in-feed conveyor 6 is provided to closely and precisely align the glass articles 3 in single file for being fed by means of a feed screw 10 and a transfer wheel 11 onto a rotating turret 12 of the crack-off machine 7. A series of star wheels 14 along both edges of the in-feed conveyor 6 which are illustrated in greater detail in FIGS. 3 and 4 are provided to align the articles 3 and to assure their upright position under feed pressure even where the glass articles may have a tapered shape as illustrated for the container 3 shown in FIG. 4. The in-feed conveyor 6 is a continuously operating conveyor which transfers the articles 3 by means of the feed screw 10 and the transfer wheel 11 (FIG. 2) onto individual support chucks 15 at the periphery of the turret 12 of the crack-off machine 7 (FIG. 2). One article is fed into each of the chucks 15 on the crack-off turret 12 for presentation to the several crack-off stations positioned around the edge of the turret.

Described in a general way, the crack-off operation comprises a pre-heating operation at a pre-heater 16 (FIG. 2) which forms a hot strain band on the glass articles in the area where the crack-off is to be done. The turning turret 12 then presents the heated articles 3 to a crack-off knife 17 which, by means of a preferred impact stroke of the crack-off knife 17, results in a crack-off or separation to remove the unwanted or moil portion of the glass article 3. Thereafter, the article 3 is moved successively past heating means which includes pre-heat nozzles 19 and an additional group of edge-melt nozzles 20 which are positioned to melt and to form a smooth narrow edge on the crack-off articles, such as a thin smooth edge on a glass tumbler.

The articles 3 are now transferred by means of a transfer wheel 21 to an annealing and cooling machine 22 shown at the right side of FIG. 1. This comprises a horizontal endless conveyor chain 22 including individual chucks 23 (FIG. 16) for carrying and continuously rotating the glass articles 3 as they pass through a row 24 of annealing flames which temper the newly formed edge portions on the glass articles 3. The articles 3 then pass through room temperature zone 25 and then move along a forced cooling air zone 26 which reduces the temperature of completed articles substantially. The articles 3 are then transferred by transfer wheel 27 onto an additional cooling conveyor 28 and an inspection and accumulating table 29.

THE IN-FEED CONVEYOR SYSTEM

As described above, the rows 2 of articles 3 are intermittently fed by the intermittent conveyor 4 by a rotating transfer wheel 30 onto the in-feed conveyor 6 preferably of the type illustrated in detail in FIGS. 3 and 4.

Significant quantities of glassware articles which are to be processed or cracked-off in crack-off apparatus have non-uniform or tapering cross-sections after being formed on the glass forming machinery. A tapered article 3 of this type is illustrated, for example, in FIG. 4. As formed in the glass forming machine, this hollow glass article has been shaped to provide a glass vessel, such as a glass tumbler, having straight but tapered side walls. The upper portion or moil 3A will be removed during the crack-off operation along a line illustrated at 3B to form the completed tumbler portion 3C.

The in-feed conveyor 6 forms a closely spaced single-file line of the glass articles 3 so that they may be fed at high speed and continuously to the operating chucks 15 of the crack-off machine 7 of FIG. 2. The conveyor 6 comprises a conventional table top conveyor belt 32 mounted on suitable end pulleys and including adjustable side rails 33 adapted for horizontal and vertical adjustment on side rails support members 34. An adjustable top rail 35 is also preferably provided on a top rail support arm 36. A series of star wheels 14 are rotatably mounted along both edges of the conveyor on adjustable support arms 38 for the purpose of spacing the articles 3 longitudinally on the conveyor belt 32 and for centering them thereon. The preferred star wheels 14 included crossed spacing arms 39 and they are rotatably mounted at their center 40 with ends of adjacent star wheel arms 39 overlapping one another. The overlap is facilitated by having adjacent star wheels 14 mounted at differing heights as seen in FIG. 4.

As illustrated in FIG. 3, the star wheels 14 at one side of the conveyor, which are the top wheels illustrated in FIG. 3, have their centers 40 positioned on a line midway between the centers 40 of the star wheels 14 on the opposite side of the conveyor belt 32. With the lateral spacing of the star wheel centers being slightly greater than the article diameter at the star wheel 14 height and with the conveyor side rails adjusted, as shown, this arrangement of the star wheels 14 is seen to provide individual adjacent pockets for the advancing articles 3 formed by adjacent arms 39 of the lower star wheels 14 and by one arm 39 of each of two adjacent upper star wheels 14. The star wheels 14 thus form a series of temporary supporting and spacing pockets for the moving file of articles 3.

The containers 3 are thus seen to be spaced in a longitudinal direction from one another by the interposition of the star wheel arms 39. This prevents the conveyor feed pressure or force from causing the containers 3 to jam against one another and prevents them from tilting and falling on the moving conveyor belt 32. The endmost article 3 passes from the end star wheels 14 into the spaced pockets 42 of the feed screw 10 and auxiliary conveyor 43 and the adjacent transfer wheel 11 as illustrated in FIG. 5.

CRACK-OFF TURRET LOADING FEED SCREW AND TRANSFER WHEEL

The glass articles 3 leaving the in-feed conveyor 6 are transferred to the spaced chucks 15 on the crack-off turret 12 by means of the feed screw 10, the cooperating auxiliary feed screw conveyor 43, and the transfer wheel 11. FIG. 5 is a plan view of these elements illustrating the glass articles 3 as they are fed into the pockets 42 of the rotating feed screw 10 while they are supported and moved by the conveyor 43. A resiliently mounted guide rail 45 is provided opposite to the feed screw 10 to hold the articles 3 in the feed screw pockets 42 to assure a proper spacing of the articles 3 for their entry into the pockets of the transfer wheel 11. The transfer wheel 11 is seen to have a series of radially directed arms 46 which engage and carry the articles 3 from the conveyor 43 onto a curved transfer plate 47. A curved support rail 48 guides the articles 3 and holds them against the arms 46 of the transfer wheel 11 as the articles 3 slide along the transfer plate 47 and then move onto the cup-like heads of the chucks 15 on the moving crack-off turret 12. The container engaging arms 46 on the transfer wheel 11 are seen to be pivotally mounted on the wheel hub 49 and to be yieldably held in position by coil springs 50. The normal position of each arm 46 is set by the locating pins 51 attached to the wheel hub 49. The arms 46 are permitted to swing rearwardly in the event that they encounter a misplaced article and also during the transfer of the glass articles 3 into the chucks 15 on the crack-off turret when flared articles 3 are pressed downwardly into the chucks 15 by a pusher device to be further described below.

When the articles 3 being cracked-off are tapered, as shown for example in FIG. 9, downward movement of the articles 3 into the chucks 15 forces the transfer arms 46 on the transfer wheel 11 to swing rearwardly to compensate for the article taper.

FIG. 6 is a sectional view of a preferred embodiment of the transfer wheel 11 showing the wheel hub 49 mounted at the upper end of a vertical drive shaft 52. The preferred drive shaft 52 is seen to include an overload clutch arrangement as illustrated at the bottom of FIG. 6. This arrangement includes a drive disc 53 attached to the lower or driven portion 52A of the shaft having spring loaded ball plungers 54 attached to its outer edge. These ball plungers 54 releasably engage spaced detents 55 in a drive disc 56 coupled to the upper portion 52B of the shaft 52. The upper portion of the shaft 52B is released from the drive in the event it encounters an obstacle as the ball plungers 54 are forced out of the detents 55 by relative motion between the upper and lower discs 53 and 56.

The transfer wheel hub 49 is seen to include a flange portion 49A rotatably mounted on an inner hub 49B with a worm and pinion 59,60 adjustably connecting these portions together. Rotation of the worm 59 by means of its control handle 61 (FIG. 5) adjusts the relative position of the transfer wheel arms 46 with repsect to the position of the drive shaft 52 to facilitate the synchronization of the article feeding system.

FIGS. 7 and 8 illustrate a preferred embodiment of the drive means for the feed screw 10 and the feed screw conveyor 43. This drive is seen to include a worm gear speed reducer 63 whose output shaft 64 is coupled by a drive chain 65 to a right-angle miter gear box drive 66. One end of the output shaft 67 of the drive is coupled by a suitable chain 68 to the end pulley shaft 69 of the in-feed conveyor 43 while the opposite side is coupled by a chain drive system 70 including a phase adjuster 71 to the feed screw 10 by means of chains 72 and 73. The same drive chain system is also coupled through a second phase adjustor 74 and drive chain 77 to a horizontal drive shaft 75 at the upper portion of the drive chain assembly which operates a pusher arm 76 (FIG. 7) for pressing the articles 3 into the crack-off turret chucks 15 as will be described below.

THE CRACK-OFF TURRET ARTICLE SUPPORT CHUCKS AND THE PUSHER MEANS FOR LOADING THE CHUCKS

As already indicated, the continuously turning crack-off turret 12 has a series of individual article supporting chucks 15 mounted on its periphery for carrying the articles 3 through the several stations involved in the crack-off process.

FIGS. 11 and 12 are cross-sectional views of one of these chucks 15 as mounted at the outer edge of the turret 12. FIG. 11 shows a chuck 15 in its lowered or crack-off position with a glass article 3 held in position therein by a vacuum force.

FIG. 12 illustrates the same chuck 15 in its raised or article transfer position with the vacuum force released to permit ready loading or unloading of an article 3.

Each of the chucks 15 is rotatably mounted in a bearing support 80 on spaced ball bearings 81. The main spindle 82 has a drive sprocket 83 mounted on its lower portion which engages an endless drive chain 84 during portions of the turret revolution to rotate each of the individual chucks 15 during the crack-off operations. The upper portion of the main spindle 82 has a cup-like article support head 85 attached to it which includes a removably mounted collar 86 proportioned to receive the particular article being handled. The main spindle 82 has a hollow center which slidably supports an inner spindle 87 having an article supporting turntable 88 attached to its upper portion. This inner spindle 87 is moved between its operating position shown in FIG. 11 and its raised article transfer position illustrated in FIG. 12 through the intermediation of a stationary lift cam 89 which engages a rounded cam surface 90 at the bottom of the inner spindle 87. As seen in FIG. 12, resiliently mounted ball plungers 91 are provided to releasably hold the inner spindle 87 in its raised position by engaging groove 92. Thus, for example, the cam 89 is positioned to raise the spindle 87 in advance of the article take-out position to permit removal of the articles 3 from the crack-off turret 12. The plungers 91 will retain the spindle 87 in its raised position as the crack-off turret 12 moves the chuck 15 to the loading position where an article 3 will be moved onto the turret 12 by the transfer wheel 11. The inner spindle 87 will then be pushed back to its lowered or operating position by the pusher 76 which presses down on the article 3 thereby lowering the spindle 87 and turning on the chuck vacuum.

Each of the chucks 15 is coupled to a source of vacuum by a vacuum inlet 93. FIG. 11 illustrates the vacuum inlet 93 coupling the vacuum source to the upper surface of the turntable 88 through interconnected conduits 94 in the chuck body 85, 95 in the inner spindle, and 96 in a vacuum control plug 97. This vacuum source is seen to be cut off when the inner spindle 87 is raised to its article transfer position, as shown in FIG. 12, by movement of the vacuum conduit 95 away from the conduit 94 in the chuck body 85. Suitable sealing rings 98 are provided to seal off the vacuum conduit 94 both in its connected and unconnected positions. When the inner spindle 87 is in its raised position, the vacuum force on the bottom of the article 3 is seen to be released by the admission of air into the inner spindle conduit 95 through an air inlet 99 in the chuck head 85.

Figure 10:
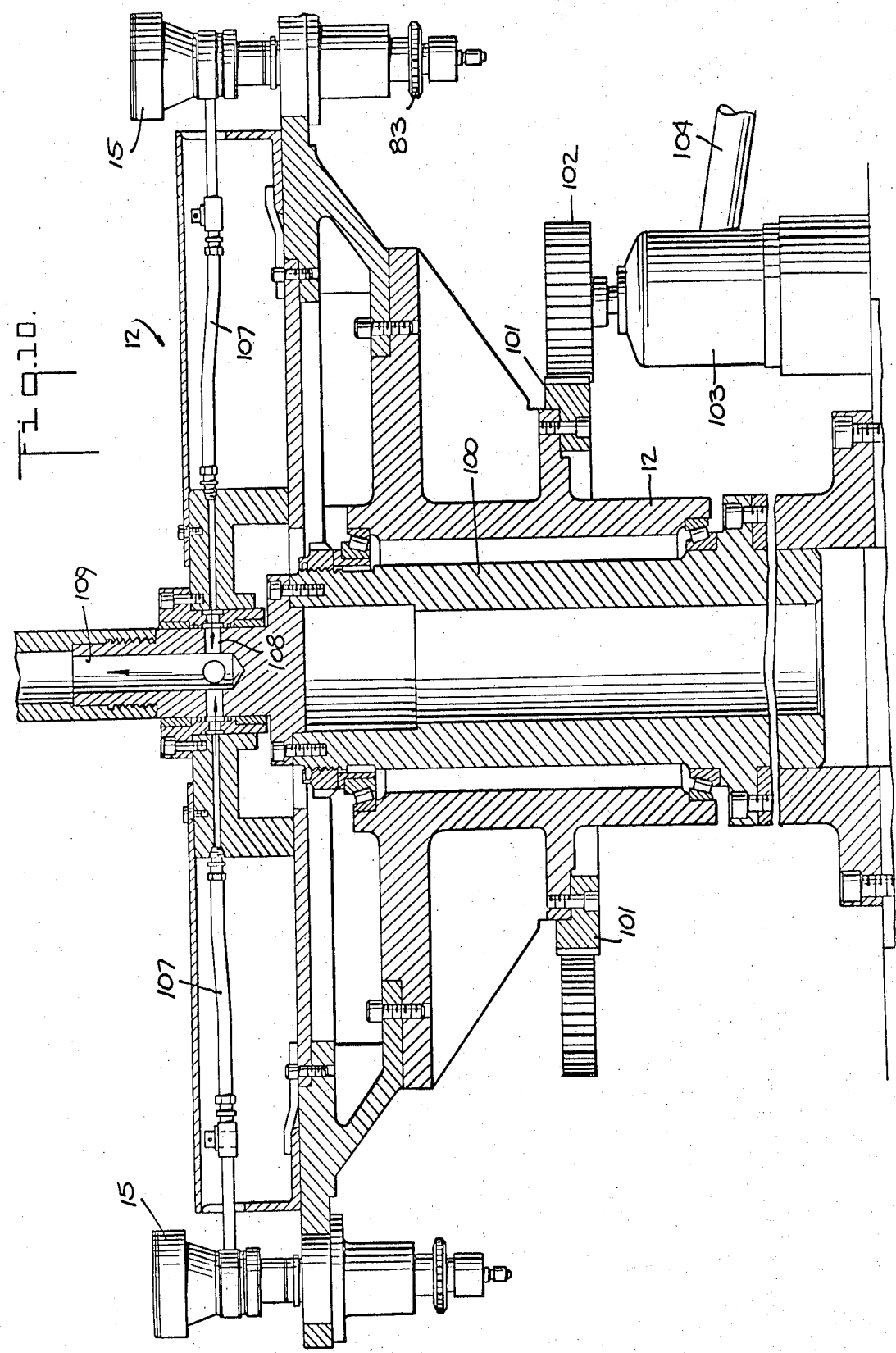
FIG. 10 is a vertical sectional view of the crack-off turret of FIG. 2 illustrating portions of the drive mechanism and the chuck mountings.
Figure 13:
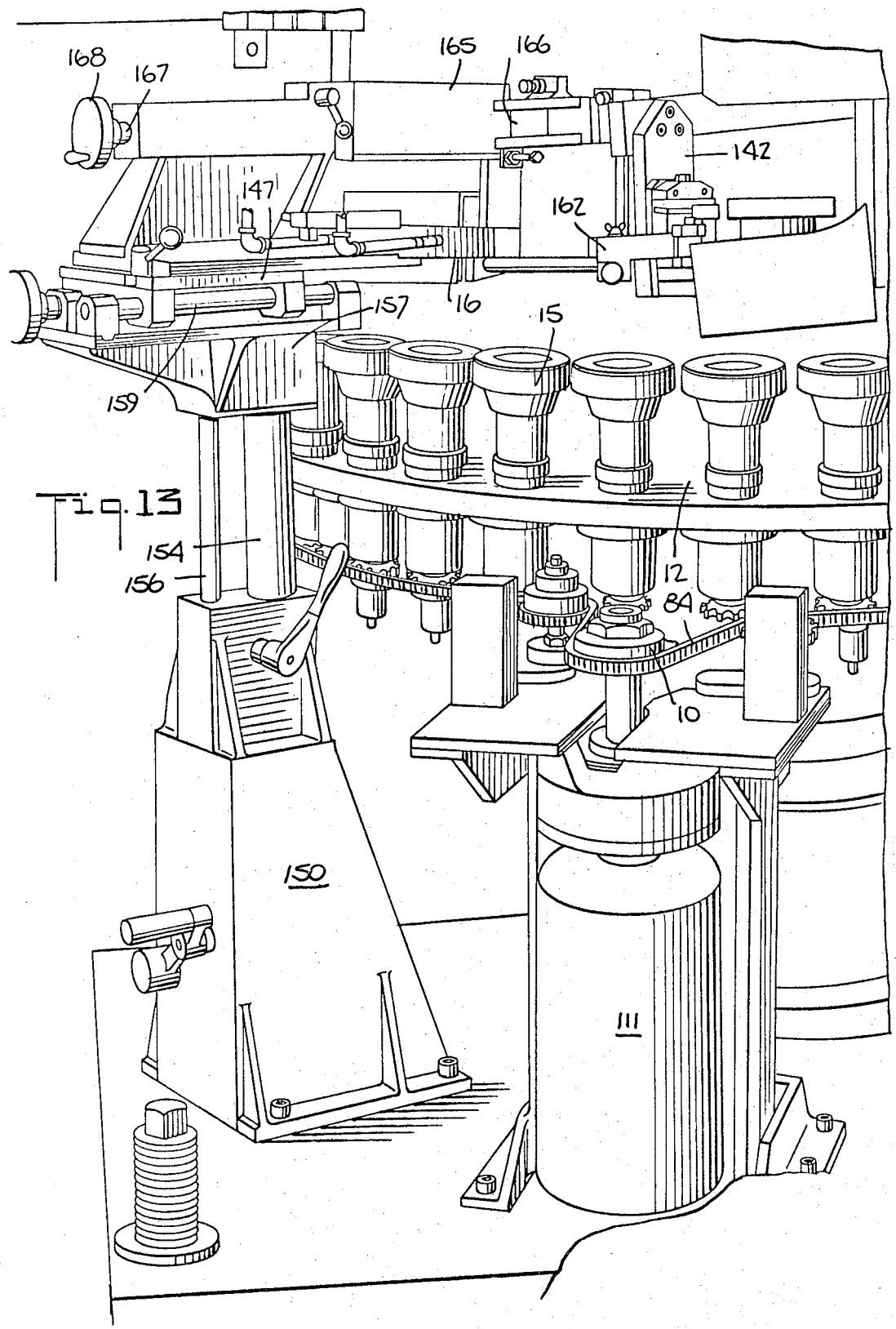
FIG. 13 is a perspective view illustrating portions of the crack-off turret and the crack-off station.

The turret 12, as shown in FIG. 10, is mounted for continuous rotation around a center post 100. The main drive gear 101 on the turret is driven through the intermediation of pinion 102 through gear box 103 and drive shaft 104. Shaft 104, as shown in FIG. 2, is coupled through a speed reduction and power transfer means 105 to an electric drive motor 106.

The vacuum inlet 93 at each chuck is coupled by a line 107 and a distributor 108 to a vacuum conduit 109 at the center post 100.

The chucks 15 are rotated by the endless chain 84 which, as seen in FIG. 23, driven by sprocket 110 on drive motor 111. The drive chain 84 is seen to be spaced from the turret drive sprockets 15 adjacent to the drive motor. This causes the spindles to cease rotation at the crack-off staion which is desired to facilitate the operation of the crack-off knife in striking a non-rotating article.

Figure 14:
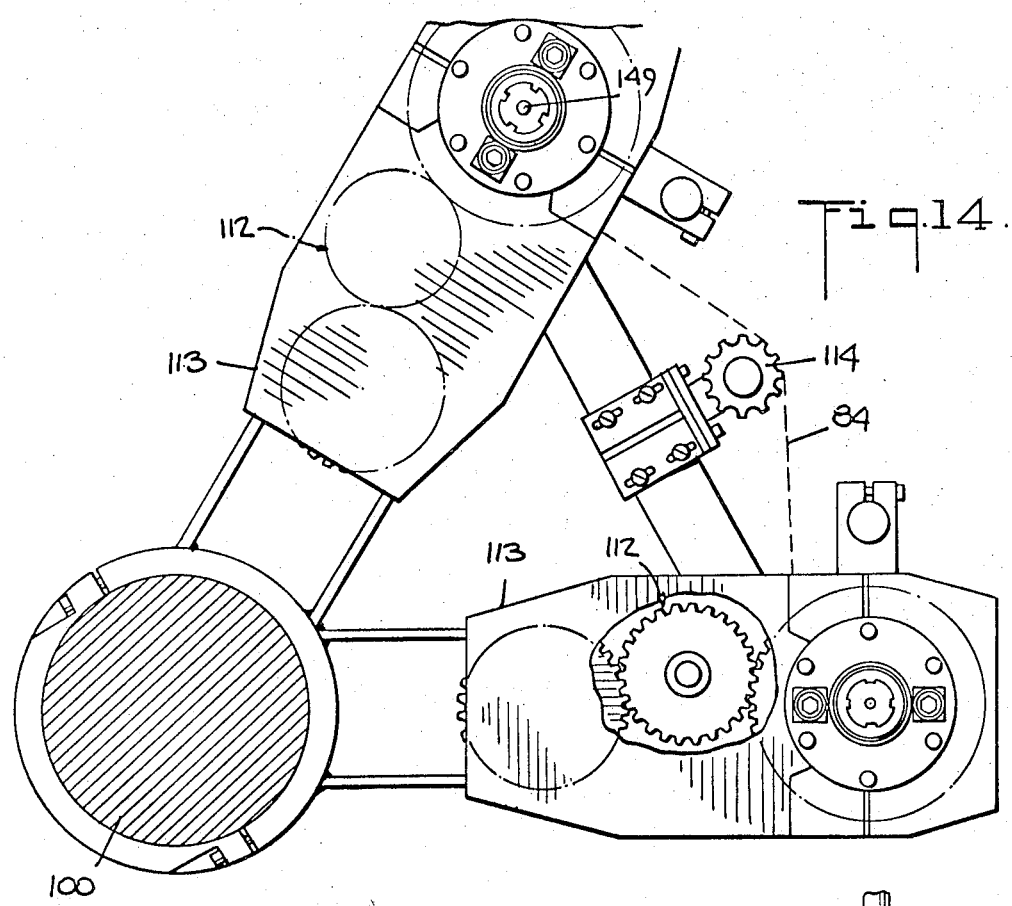
FIG. 14 is a detailed top plan view of the drive means for the article transfer wheels.
Figure 15:
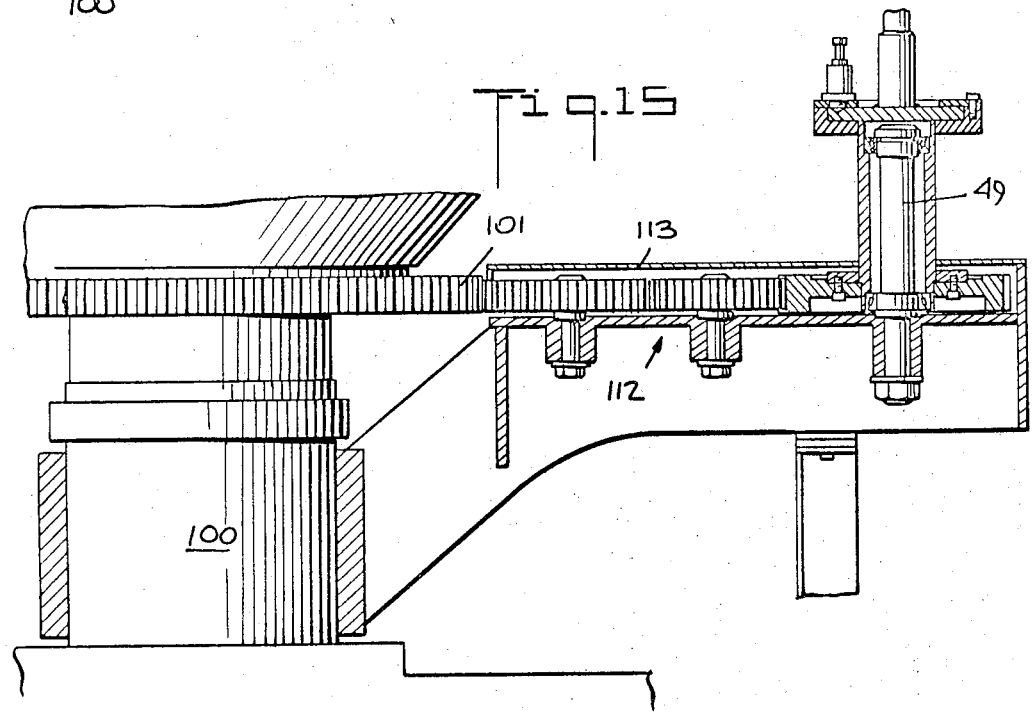
FIG. 15 is a vertical sectional view of the drive means of FIG. 14.

FIGS. 14 and 15 illustrate the take-off drive means by which the turret 12 in-feed and out-feed transfer wheels 11 and 21 are driven in synchronism with the moving turret 12. These drive means comprise gear trains 112 mounted in suitable support brackets 113 and driven by the main turret drive gear 101. The drive shafts of the transfer wheels, such as the drive shaft 49 for transfer wheel 11, are coupled to the outer end of the gear trains 112. As already indicated, the chucks 15 are preferably stationary during the in-feed and the out-feed of the articles at transfer wheels 11 and 21. For this purpose, the continuously driven sprocket drive chain 84 powered by the drive motor 111 (FIG. 23) is guided radially outwardly and away from the individual chuck drive sprockets 83 by an idler sprocket 114 from the time that each chuck 15 approaches the off-feed transfer wheel 21 until it is moved beyond the in-feed transfer wheel 11.

The article pushing device for pressing each of the articles 3 downwardly into a chuck 15 as the articles are transferred from the transfer wheel 11 to the chucks 15 is illustrated in FIGS. 7, 8 and 9. As already described, after each article 3 is positioned on a chuck 15, the article 3 is pressed downwardly into the chuck 15 and is held in position therein by a vacuum force. The pushing device 120 comprises a pusher arm 76 mounted for vertical and horizontal movement on a support bracket 121 at the junction of the paths of the transfer wheel 11 and the turret chucks 15. A pad 122 is mounted on the lower end of the pusher arm 76 which engages the top of each article 3 as seen in FIG. 9 and which presses the article 3 down as the pad 122 also moves forward in the general direction of each of the moving article support chucks 15. The pusher arm 76 is mounted in a support sleeve 123 attached to a carriage 124. The carriage 124 is mounted on upper and lower slide rods 125 for horizontal movement (FIG. 9). The rotating pusher drive shaft 75, already described above, includes a cam 126 which moves the carriage 124 back and forth through the intermediation of a cam roller 127 attached to the carriage 124 (FIG. 7). Simultaneously, spaced cam rails 128 attached to the pusher arm 76 are intermittently engaged by a second cam roller 129 mounted off-center on cam 125 so that the pusher arm 76 is lowered during its forward horizontal movement to engage the article 3 to press it into the chuck 15. The roller then engages the upper rail 128 to lift the pusher arm 76 clear of the lowered article 3 during the carriage 124 return motion.

The pusher arm 76 is seen to be resiliently mounted in its support sleeve 123 by means of a coil spring 131. This permits upward movement of the arm 76 in the event that the article 3 cannot be seated properly in the chuck head and particularly if the glass article is oversized. This relative upper movement of the pusher arm 76 closes a microswitch 132 positioned adjacent to the pusher arm 76. When the microswitch is closed, a reject solenoid 133 (FIG. 2) is activated so that the pusher arm 134 rejects that article 3 from the crack-off turret. When the article 3 cannot be pushed down, the vacuum system in that spindle 15 remains disconnected as described above.

THE CRACK-OFF TURRET AND THE CRACK-OFF STATIONS AND OPERATION

The crack-off machine 7 on which the crack-off turret 12 is mounted and around which the various crack-off operation stations are mounted will now be described with particular reference to the plan view of the machine shown in FIG. 2 and with reference to certain additional detail drawings which will be referred to when appropriate.

Described in a general way, the crack-off machine 7 has a rotating turret 12 with the chucks 15 mounted at its periphery. The turret is continuously turned so that the chucks 15 are moved in a circular path together with their supported articles 3 successively past the several crack-off operation stations between the intake wheel 11 and the out-feed wheel 21. The plunger 76 is setting each article 3 in a chuck 15 has been described above. The first station which the article moves past is the reject station where the reject arm 134 removes improperly seated articles as detected at the plunger sensing device 133 described above. Thereafter, properly seated articles 3 move along to the strain band or crack-off burner 16 which heats the narrow band on the revolving article 3 as its supporting chuck rotates. This strain band 140 (FIG. 1C) is located above and below the line 141 along which the crack-off is to be made. After the articles 3 leave the crack-off burner 16 they move to the impact or crack-off station where each container is struck sharply by a crack-off knife 17. This knife 17 is swung to tap or strike the article 3 by means of a swinging knife support arm 162 which is flipped towards the article 3 by means of a pull of air. Upon being thus struck with the knife 17, the upper portion or moil 3A (FIGS. 1D and 1E) separates or cracks-off from the remaining portion 3C of the glass article 3 along a circular line extending in a horizontal plane around the glass article. The separated moil 3A is blown or otherwise moved clear of the still advancing lower portion of the article.

The article 3 is now carried past a pre-heat burner 19 where a series of flames are directed against the newly formed edge of the glass in a pre-heating operation preparatory to an edge melting operation. The now again rotating article 3 is then carried past a series of edge melting nozzles 20 which are directed against the new edge at predetermined angles to smooth or round the edge to thereby complete formation of the new thin and smooth article edge such as a drinking rim for a glass tumbler.

The articles 3 now are carried on towards the take-off wheel 21 as the spindles 87 in their supporting chucks 15 are raised at a take-off cam 89 to the position illustrated in already described FIG. 12. The raised articles 3 slide onto the take-off support plate 143 and are carried around that plate by an arm of the take-off wheel 21 which is similar to the arms 46 already described in connection with the in-fed transfer wheel 11. The articles 3 are now transferred from the take-off wheel into a chuck on the annealing and cooling conveyor 23 as will be further described below.

THE ANNEALING AND COOLING MEANS

The annealing and cooling means comprises an endless chain 22 including a series of individual chucks 23 which support cracked-off and polished articles 3C and csrry them past a row of annealing flames 24 and a cooling means 25, 26 and 28. A preferred conveyor 22 is illustrated in detail in FIGS. 16 and 17. It includes a series of spaced chucks 23 including a support spindle 202 mounted in suitable bearings 203 in a link member 204. The several link members are pivotally connected together by spaced links 205 which rotatably engage the body portions of the links 204 to move them around the closed conveyor path. The assembled chain 22 is supported on a suitable frame 206 by means of horizontal rollers 207 and a vertically aligned lower roller 208 which engage tracks 209, 210 and 211. A driven end sprocket 212 moves the conveyor 22 (FIG. 1). The individual spindles 202 are rotated through the intermediation of sprockets 213 attached to the lower end of the spindles 202 and which engage suitable rack members 214 mounted along the path of the conveyor 22. The spindle 202 includes a center rod 215 mounting the article supporting pad 216. This rod 215 is lifted to a raised position by a stationary lift cam 217 as each of the chucks 23 move past the feed wheel 21 and the similar take-off wheel 27 which carries the completed articles 3C to the final cooling conveyor 28 and inspection table 29.

As seen in FIGS. 1A and 1H, the articles 3C are first moved along a flame annealing means where the upper portions of the cracked-off articles 3C are exposed to ribbon or other burners 218 to raise their temperature to the annealing point above the strain temperature of the glass. The heated articles are now exposed to forced air cooling at air cooler 26 and final cooling on conveyor 28 to complete the tempering process for final inspection and packing operation on table 29.

Having thus described my invention, I claim:

1. An improved transfer and feeding apparatus for moving articles into spaced supports on a continuously rotating turret from spaced lateral rows of the articles on a continuously moving conveyor comprising the combination of:
   an intermittently advanced narrow conveyor for moving the articles in single file;
   a transfer plate positioned between the end of said first conveyor and a side portion of the narrow conveyor and inclined downwardly toward the narrow conveyor;
   means for vibrating said transfer plate;
   means adjacent said transfer plate for controlling the intermittent advance of said narrow conveyor in response to the passage of articles;
   a second narrow conveyor for receiving articles from said first narrow conveyor;
   an article spacing means mounted on the second narrow conveyor;
   a transfer wheel rotatably mounted at the end of said second narrow conveyor for moving articles from the second narrow conveyor means to the turret; and
   means for continuously rotating said transfer wheel.

2. The apparatus as claimed in claim 1 in which said means for controlling the intermittent advance of said narrow conveyor comprises sensing means positioned for detecting the passage of articles toward said narrow conveyor, control means including a timer coupled to said drive for said narrow conveyor, and said sensing means being operatively connected to said control means for activating said drive for a timed period upon the detection of articles by said sensing means.

3. The apparatus as claimed in claim 1 in which said article spacing means on said second narrow conveyor comprises a plurality of star wheels pivotally mounted along both edges of said second narrow conveyor and with the pivotal mountings on one side of the conveyor being offset from the pivotal mountings on the opposite side of the conveyor.

4. The apparatus as claimed in claim 1 in which said transfer wheel comprises a hub, a plurality of spaced radially oriented arms for engaging the articles, and resilient mounting means on said hub for said arms permitting the arms to move in a direction opposite from the direction of rotation of said transfer wheel.

5. The apparatus as claimed in claim 1 which further comprises a helicoid positioned between the exit end of said second narrow conveyor and said transfer wheel for carrying articles to said transfer wheel in a spaced line.

* * * * *